United States Patent Office 2,899,244
Patented Aug. 11, 1959

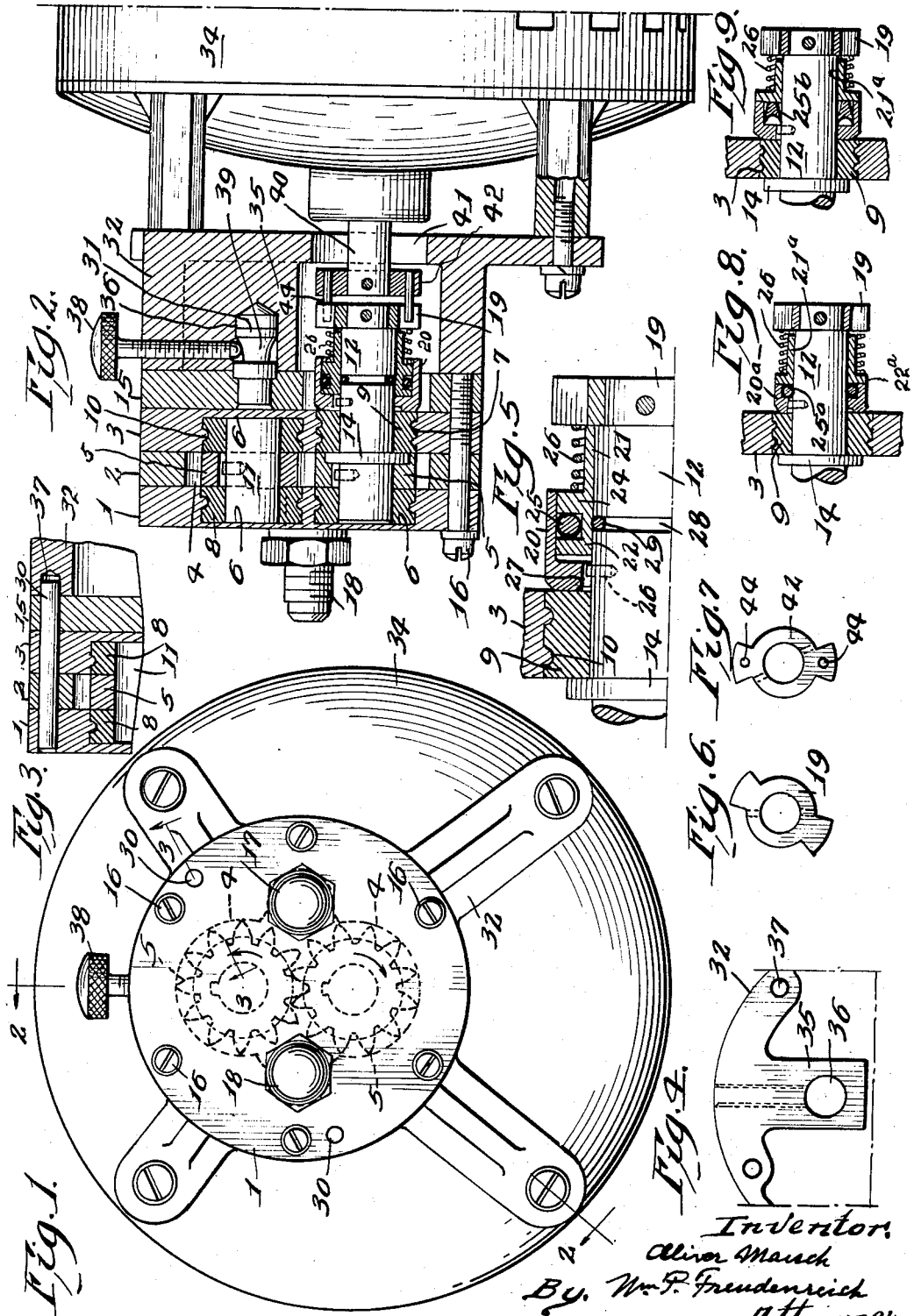

2,899,244
ROTARY SHAFT SEAL
Oliver Maisch, Chicago, Ill.
Original application December 12, 1952, Serial No. 325,730, now Patent No. 2,764,100, dated September 25, 1956. Divided and this application August 1, 1956, Serial No. 601,395

6 Claims. (Cl. 308—36.2)

There is at present a great demand for low capacity pumps for industrial, commercial, chemical and biological laboratories and processing uses. By low capacity is meant the ability to pump any quantity of material from zero gallons to five gallons per minute, for example. Not only is great accuracy necessary, but the material that is pumped must not be damaged structurally or by being tainted by the materials used in the pump parts, or because of uncleanliness of the pump surfaces with which it comes in contact.

This application is a division of my application Serial No. 325,730, bearing the above title and filed December 12, 1952, now U.S. Patent 2,764,100, issued on September 25, 1956.

I have found that gear pumps are preferable to other pumps for low capacity service. One of the difficulties heretofore experienced with these gear pumps is leakage past the pump shaft coupled to the shaft of the means which drives the same. The object of the present invention is to produce a seal which, for all practical purposes, eliminates leakage past the incoming pump shaft.

The various features of novelty whereby the present invention is characterized will hereinafter be pointed out with particularity in the claims, but, for a full understanding of the invention and of its objects and advantages, reference may be had to the following detailed description taken in connection with the accompanying drawings, wherein:

Fig. 1 is an end view of one of my improved pumps, attached to a motor.

Fig. 2 is a section on irregular line 2—2 of Fig. 1, only a small fragment of the motor being shown.

Fig. 3 is a section on line 3—3 of Fig. 1, showing only a small fragment.

Fig. 4 is a face view, showing a fragment of an adapter between the pump unit and the motor.

Fig. 5 is an axial section through one half of the seal present in Fig. 2, on a larger scale and illustrating a condition created by incipient leakage.

Figs. 6 and 7 are face views of the two cooperating coupling elements mounted on the pump shaft and the motor shaft, respectively.

Fig. 8 is a sectional view corresponding to Fig. 2, showing only the seal, in a slightly modified form.

Fig. 9 is a view similar to Fig. 8, showing the same seal containing, however, a slightly different packing ring.

In the drawing the pump casing or housing, proper, comprises three thick, round discs 1, 2 and 3, placed flat against each other. The central disc 2 contains conventional pump chambers 4, 4 in which are located pump gears 5, 5. Discs 1 and 3 constitute the end walls of the pump. Each of the latter discs contains two chambers coaxial with the pump chambers. Chambers numbered 6 do not extend through the discs but are round wells opening into the pump chambers. Chamber 7, in disc 3, extends clear through this disc. In chambers 6 are ring-like, oilless, self-lubricating bearings 8; cast or molded into their positions of final use. Bearing 9 in chamber 7 is likewise self-lubricating, oilless and cast or molded in place. All four of these bearing chambers contain annular ridges 10, so that the bearings are locked into the end walls of the pump.

Upper gear 5 surrounds and rotates with a short shaft 11, mounted at its ends in two of the bearings 6 in walls 1 and 3, respectively. The lower gear surrounds and is driven by a longer shaft 12 which fits at one end into the lower of the two bearings 8 in end wall 1, and which extends through bearing 9 and projects far beyond the pump casing. Shaft 12 has thereon an annular flange 14 that has a lapped surface bearing against the inner face of bearing member 9.

Discs 1, 2 and 3 are fastened together and to an adapter disc 15, which lies flat against disc 3, by long bolts 16. The pump is provided with an inlet 17 and an outlet 18, through wall 1.

In order to prevent leakage along shaft 12 to the exterior of the pump casing, flange 14 must be held tightly against bearing member 9. This may be done as follows. On the outer end of shaft 12 is a stop in the form of a coupling element 19. Surrounding the shaft is a sealing cup 20 the bottom of which bears against the outer face of bearing member 9. On the shaft is a tubular strut 21 slightly shorter than the distance between the stop and the bottom wall of the cup. On the part of the strut within the cup are two annular flanges 22 and 24, spaced apart from each other. In the channel between these flanges is an O ring packing 25. Surrounding the strut and bearing at its ends against stop 19 and flange 24, respectively, is a compression spring 26. This spring normally forces the strut to the left so as to press the bottom of the cup against bearing member 9. This also creates a pull on shaft 12, so that bearing member 9 is clamped between flange 14 on the shaft and cup 20. Cup 20 and bearing member 9 meet in a lapped joint.

Cup 20 is preferably held against rotation relative to shaft 12, this being accomplished by a pin 26 projecting radially from the shaft into a notch 27 in the bottom wall of the cup.

Also, if desired, that part of shaft 12, surrounded by the cup, may contain a circumferential groove 28, wherein is seated a packing ring 29 that contacts the inner surface of the tubular strut.

In the particular embodiment illustrated, there are two long dowel pins 30, 30 extending through discs 1, 2, 3 and 15 and protruding from the outer face of the latter. Also, in this embodiment, there is a heavy pump retaining pin 31 fixed at one end to disc 15 and projecting outward from the latter farther than do the dowel pins. These several pins are adapted to enter sockets in a member 32 secured in any suitable manner to one end of the casing of a motor 34. The body portion of member 32 is a cylindrical cup of the same diameter as the pump; its open end being closed by disc 15. Member 32 contains a thick radial partition 35 having therein a bore 36 into which pin 31 slidably fits. The sockets 37 for the dowel pins 30 are in the rim of member 32.

A thumb screw 38 extends radially from the exterior of member 32 down through partition 35 and into bore 36. Pin 31 contains a wide peripheral groove 39 the bottom of which slopes upwardly as the distance from disc 15 increases. The screw enters this groove and, as it moves inwardly, engages the sloping bottom and produces a wedging effect to pull the pump tightly against adapter 32. Pin 31 and screw 38 thus form a latch to hold the two units together.

The parts are so proportioned that the motor shaft 40 extends through a hole 41 in the center of the end wall of adapter 32, almost to and aligned with pump shaft 12. On the end of shaft 40 is a coupling element 42 similar to element 19 on shaft 12; these two elements being, in effect, cross arms. Secured to element 42, toward the ends thereof, are two pins 44, 44 that project past element 19, parallel to the common axis of the shafts. When the motor shaft turns, pins 44, acting through element 19, drive pump shaft 12.

It will be seen that the complete pump unit may be detached from the motor by simply backing off thumb screw 38 and pulling the unit off endwise. To attach the unit to the motor unit again, the dowel pins and pin 39 need only be registered with their sockets and the pump unit be pushed home axially; the thumb screw being then turned to secure the two units tightly to each other. Usually the coupling of the two shafts is automatically effected. Should the two coupling elements 19 and 42 be in such relative angular positions that the pins 44 strike element 19 instead of passing by the same, in making the assembly, one need only turn the pump shaft through a small angle to allow automatic coupling to be made.

In the use of the pump, the seal heretofore described makes it practically impossible for leakage from the pump chamber to take place along the pump shaft 12. Normally the clamping of oilless bearing 9 between flange 14 on the shaft and the bottom of cup 20, under the pressure of the spring, is sufficient to prevent any leakage, due to the considerable areas of the contacting flat surfaces between parts 9, 14 and 20. However, should incipient leakage occur, liquid will enter the cup 20 between the bottom wall thereof and flange 22 of the tubular strut through notch or channel 27. This is due to the fact that the lapped joint between cup 20 and bearing 9 is leakproof, whereas the relatively open joint between flange 22 and the bottom of the cup permits liquid to pass through this joint into the cup. When liquid enters the cup a differential pressure is set up, due to the large internal diameter of the cup; this pressure resulting in pressing strut 21 back against stop 19, as shown in Fig. 5; thereby causing the full pump pressure to be exerted in the direction to hold the cup against bearing 9.

In Fig. 8 the seal is simpler than that heretofore described, the cup 20ª being somewhat smaller and the strut 21ª being shorter, so that flange 22ª abuts against the rim of the cup. Only one packing ring 25ª is required in this form.

Fig. 9 shows the same seal as does Fig. 8, except that packing ring 25ᵇ is in the form of a trough, the open side of which faces the bottom of the cup. The sides of the trough are tapered so as to terminate in thin flexible lips that touch both the shaft and the surrounding cup wall.

The parts of the pump casing may be made of various metals, stainless steel having been found satisfactory, or plastic material. Stainless steel or other metals may be used in the manufacture of the pump shafts. The insets, or shaft bearings, may consist of carbon or other self-lubricating oilless material.

The nature of the materials used in the pump depends on the use to which the pump is to be put. But, when a pump is to be used for dispensing some particular liquid, as, for example, blood plasma, biologicals and other sterile solutions, the materials must be such that the pump may be sterilized by steam in an autoclave.

I claim:

1. In combination, a pump casing having an opening through one wall, an oilless bearing fixed in said opening with opposed sides in the planes of the inner and outer surfaces, respectively, of said wall, a rotary pump shaft extending through said bearing, said shaft having thereon an annular shoulder bearing against the inner side of said bearing to form a seal, a cup surrounding the shaft on the outside of the casing and engaged at its bottom with the outer side of said bearing to form a second seal, a stop on the shaft outwardly from said cup, a closure for the open end of the cup including a packing ring within the cup and a loose tubular strut extending from the cup almost to the stop and a spring surrounding the strut and engaged at one end with the stop and acting on the strut to press the cup against said walls; whereby liquid leaking through said wall past the shaft may enter the cup between the bottom thereof and the packing and create a differential pressure tending to pull the shaft outwardly.

2. A combination as set forth in claim 1, wherein the bottom of the cup contains a notch extending through the thickness of the same beside the shaft, and wherein there is a pin projecting from the shaft into the notch to cause the cup to rotate with the shaft while retaining the capacity to move lengthwise as wear between the cup and the casing wall occurs.

3. In combination, a pump casing having an opening through one wall, an oilless bearing fixed in said opening with opposed sides in the planes of the inner and outer surfaces, respectively of said wall, a rotary pump shaft extending through said bearing, said shaft having thereon an annular shoulder bearing against the inner side of said bearing to form a seal, a cup surrounding the shaft on the outer side of the casing and engaged at its bottom with said bearing to form a second seal, a stop on the shaft outwardly from said cup, a loose tubular strut extending from the bottom of the cup almost to the stop, annular flanges on the strut within the cup, an O packing ring surrounding the strut between the flanges, and a spring engaged at one end with the stop and at the other end with the nearest flange to press the cup against said bearing; whereby liquid leaking through said wall past the shaft may enter the cup between the bottom thereof and the flange normally contacting the bottom of the cup and thus create a differential pressure tending to pull the shaft outwardly.

4. A combination as set forth in claim 3 which has, in addition, an annular packing surrounding and engaged with the shaft and surrounded by the strut.

5. In combination, a pump casing having an opening through one wall, an oilless bearing fixed in said opening with opposed sides in the planes of the inner and outer surfaces, respectively, of said wall, a rotary pump shaft extending through said bearing, said shaft having thereon an annular shoulder bearing against the inner side of said bearing to form a seal, a cup surrounding the shaft on the outer side of the casing and engaged at its bottom with said bearing to form a second seal, a stop on the shaft outwardly from said cup, a closure for the open end of the cup including a tubular strut having at one end a flange surrounding the shaft and bearing against the open end of the cup, the strut extending from the cup almost to the stop, a spring surrounding the strut and engaged at one end with the stop and at its other end with said flange to press the cup against said bearing, and an annular packing around the shaft within the cup, whereby liquid leaking through said wall past the shaft may enter the cup between the bottom thereof and the packing and create a differential pressure tending to pull the shaft outwardly.

6. A combination as set forth in claim 5, wherein the packing is in the form of an annular trough having its open side facing the bottom of the cup and having thin, flexible edges bearing against the shaft and the surrounding wall of the cup, respectively.

References Cited in the file of this patent

UNITED STATES PATENTS

| | | |
|---|---|---|
| 361,990 | Cook | Apr. 26, 1887 |
| 807,981 | Whitaker | Dec. 19, 1905 |
| 1,693,003 | Snyder | Nov. 27, 1928 |
| 1,859,012 | Winkler | May 17, 1932 |
| 1,958,246 | Olson | May 8, 1934 |
| 2,362,854 | Stephens | Nov. 14, 1944 |
| 2,434,458 | Curry | Jan. 13, 1948 |
| 2,619,039 | Maisch | Nov. 25, 1952 |